United States Patent

Lim

(10) Patent No.: US 6,798,232 B2
(45) Date of Patent: Sep. 28, 2004

(54) BUMP STRUCTURE FOR TESTING LIQUID CRYSTAL DISPLAY PANEL AND METHOD OF FABRICATING THE SAME

(75) Inventor: Joo Soo Lim, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/419,927

(22) Filed: Apr. 22, 2003

(65) Prior Publication Data

US 2004/0124868 A1 Jul. 1, 2004

(30) Foreign Application Priority Data

Dec. 28, 2002 (KR) .................................. 10-2002-0086065

(51) Int. Cl.[7] .............................................. G01R 31/00
(52) U.S. Cl. .................................. 324/770; 324/158.1
(58) Field of Search ........................... 324/770, 158.1, 324/73.1, 765; 29/829, 842, 846; 345/87, 104, 204–206, 904; 250/559.34–559.45; 257/48; 438/17–18; 349/33

(56) References Cited

U.S. PATENT DOCUMENTS

| | | | | |
|---|---|---|---|---|
| 3,590,252 A | * | 6/1971 | Lake | 250/214 LA |
| 5,546,013 A | * | 8/1996 | Ichioka et al. | 324/770 |
| 5,751,159 A | * | 5/1998 | Holm et al. | 324/767 |
| 6,028,442 A | * | 2/2000 | Lee et al. | 324/770 |
| 6,534,853 B2 | * | 3/2003 | Liu et al. | 257/692 |
| 2002/0089614 A1 | * | 7/2002 | Kim | 349/40 |
| 2003/0155943 A1 | * | 8/2003 | Morishita | 324/770 |

FOREIGN PATENT DOCUMENTS

JP 2001042277 * 2/2001 ............. G02F/1/13

* cited by examiner

Primary Examiner—Kamand Cuneo
Assistant Examiner—Paresh Patel
(74) Attorney, Agent, or Firm—Morgan, Lewis & Bockius LLP

(57) ABSTRACT

A bump structure for testing a liquid crystal display panel includes a plurality of pads arranged at a pad region along an edge portion of a liquid crystal display panel and connected to one of gate lines and data lines, a plurality of driver ICs arranged to be electrically connected to the plurality of pads, and a test bump electrically connected to at least one of the plurality of pads and arranged at the pad region except within a region where driver ICs are mounted.

12 Claims, 8 Drawing Sheets

BUMP STRUCTURE FOR TESTING LIQUID CRYSTAL DISPLAY PANEL AND METHOD OF FABRICATING THE SAME

The present invention claims the benefit of Korean Patent Application No. 86065/2002 filed in Korea on Dec. 28, 2002, which is hereby incorporated by reference.

BACKGROUND OF THE INVENTION

1. Field of the Invention

The present invention relates to a bump structure for testing a liquid crystal display panel and a method of fabricating a bump structure, and more particularly, to a bump structure for testing a liquid crystal display panel that can test the liquid crystal display panel after a driver integrated circuit (IC) is mounted.

2. Description of the Related Art

In general, display devices need to have low power consumption, high picture quality, thin profile, and light weight. Presently, liquid crystal display (LCD) devices are replacing conventional cathode ray tubes (CRTs). The liquid crystal display devices display an image by making use of an optical anisotropy of liquid crystal molecules, and the LCD devices include an upper substrate, a lower substrate, and a liquid crystal material layer formed therebetween. The upper substrate includes a color filter having sub-color filters R (red), G (green), and B (blue), a black matrix that divides the sub-color filters and shields light, and a transparent common electrode that supplies a voltage to a liquid crystal cell of the liquid crystal display device. In addition, the lower substrate includes a pixel region, a pixel electrode formed within the pixel region, and a thin film transistor (TFT) that functions as a switching device.

The upper and lower substrates are attached to each other by a sealant, thereby forming a liquid crystal display panel. Presently, the upper and lower substrates are commonly attached by an attachment key formed on one of the upper or lower substrates. Then, liquid crystal material is injected between the upper and lower substrates via an injection port, and the injection port is closed. Next, the liquid crystal display panel is tested by application of an electric field across the liquid crystal material via the common and pixel electrodes. Based upon results of the test, the liquid crystal display panel is determined to be functionally acceptable or defective.

After the test, a driving circuit that includes a driver IC is installed in the liquid crystal display panel, and is connected to gate and data pads by one of a tape carrier package (TCP) method or a chip-on-glass (COG) method. The driving circuit utilizes a printed circuit board (PCB) configuration such that surface mounting technology (SMT) is used. Thus, circuitry components can be thin and can be mounted with a high density.

The TCP method includes mounting the driver IC chip on an anisotropic conductive film of high polymer having a width of 35 mm or 48 mm. To perform the TCP method, the conductive film is attached on an electrode of the liquid crystal display panel, and a compression process is performed using heat. Accordingly, the amounts of heat and pressure have to be properly applied.

The COG method includes direct mounting the driver IC on a glass substrate of the liquid crystal display panel using a bump technology that is significantly different from the TCP method for mounting the driver IC onto the conductive film. Thus, the COG method can reduce production costs since the TCP is not required. However, using the COG method increases a size of the glass substrate of the liquid crystal display panel.

FIG. 1 is a partial plan view of a liquid crystal display panel of a TCP method according to the related art. In FIG. 1, a liquid crystal display panel 10 is formed by attaching an array substrate 20 and a color filter substrate 50. The array substrate 20 is divided into a first region 55 that corresponds to the color filter substrate 50 and a second region 25 of an outer periphery of the array substrate 20 that does not correspond to the color filter substrate 50. In addition, the array substrate 20 includes a gate line 30 and a data line 40 arranged along horizontal and vertical directions, respectively, and a switching device, such as a thin film transistor (not shown), is formed at an intersection region between the gate and data lines 30 and 40.

Pads (not shown) are formed at end portions of the gate and data lines 30 and 40, and are located at the second region 25 of the array substrate 20. A horizontal pad constitutes a data pad that is connected to the data line 40, and a vertical pad constitutes a gate pad that is connected to the gate line 30. In addition, the array substrate 20 is formed to be a little larger than the color filter substrate 50 to accommodate the gate and data pads. Moreover, the liquid crystal display device includes a print circuit substrate 70, a TCP 80 for connecting the print circuit substrate 70 to the liquid crystal display panel 10, and a data transmitting line 75 for transmitting a gate signal to a gate driver IC 85.

FIG. 2 is a partial plan view of a liquid crystal display panel of a COG method according to the related art. In FIG. 2, at the second region 25 of the periphery of the array substrate 20, a gate driver IC chip 93 is connected to the gate line 30 and a data driver IC chip 94 is connected to the data line 40 are mounted. In addition, input lines 91 are connected to input terminals (not shown) of the data driver IC chip 94 and the gate driver IC chip 93 formed on a flexible printed circuit (FPC) 90.

With the COG method, although not shown, an input pad and an output pad are formed at a region where the driver IC chips 93 and 94 are to be mounted. The input pad receives a driving signal from the FPC 90 that is connected to the liquid crystal display panel 10, and the output pad outputs the driving signal to the gate line 30 or the data line 40. In addition, the liquid crystal display panel of the COG method is provided with a pad for testing (not shown) the liquid crystal display panel before the driver IC chips 93 and 94 are mounted.

SUMMARY OF THE INVENTION

Accordingly, the present invention is directed to a bump structure for testing a liquid crystal display panel that substantially obviates one or more of the problems due to limitations and disadvantages of the related art.

An object of the present invention is to provide a structure for testing a liquid crystal display panel during each fabrication process after mounting of a driver IC.

Another object of the present invention is to provide a method for fabricating a structure for testing a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a bump structure for testing a liquid crystal display panel includes a plurality of pads arranged at a pad region along an edge portion of a liquid crystal display panel and connected to one of gate lines and data lines, a plurality of driver ICs are arranged to be electrically connected to the plurality of pads, and a test bump electrically connected to at least one of the plurality of pads and arranged at the pad region except within a region where driver ICs are mounted.

In another aspect, a method of fabricating a bump structure for testing a liquid crystal display panel includes forming a plurality of pads arranged at a pad region along an edge portion of a liquid crystal display panel and connected to one of gate lines and data lines, mounting a plurality of driver ICs to be electrically connected to the plurality of pads, and connecting a test bump to at least one of the plurality of pads and arranged at the pad region except within a region where driver ICs are mounted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
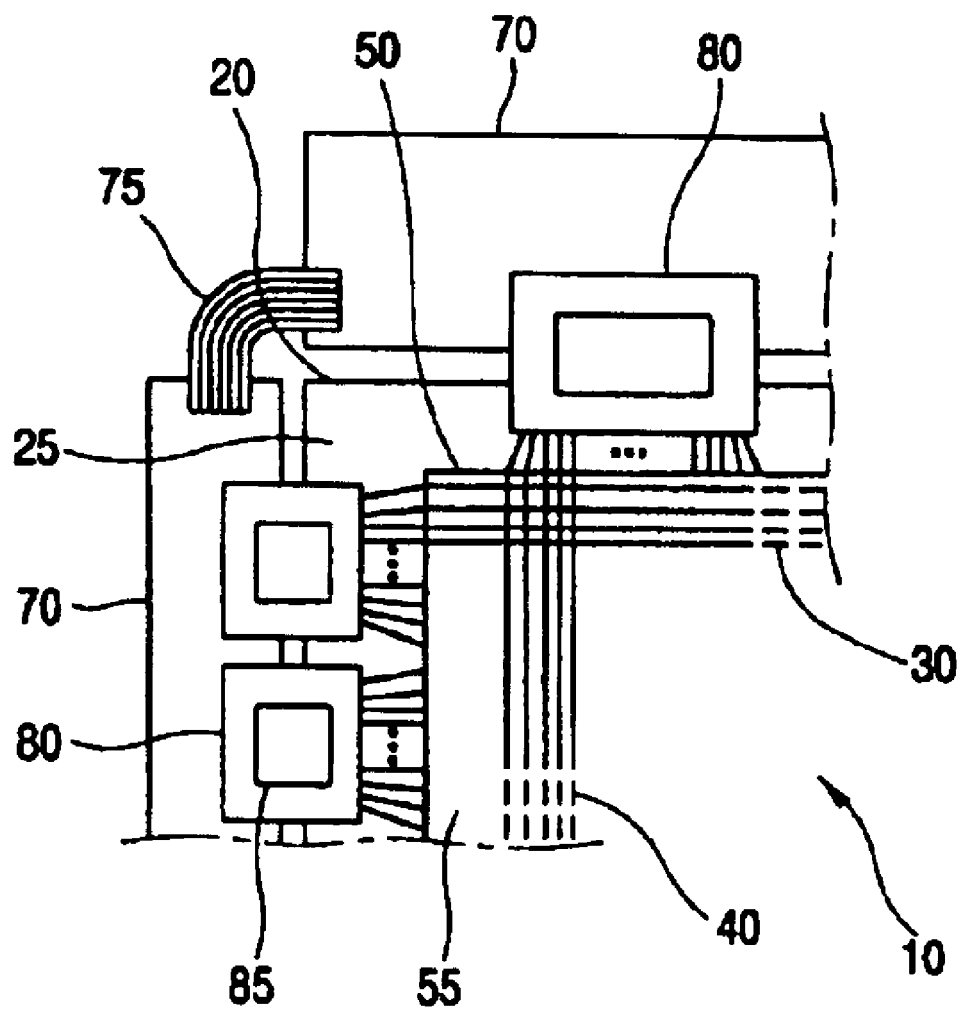
FIG. 1 is a partial plan view of a liquid crystal display panel of a TCP method according to the related art.
Figure 2:
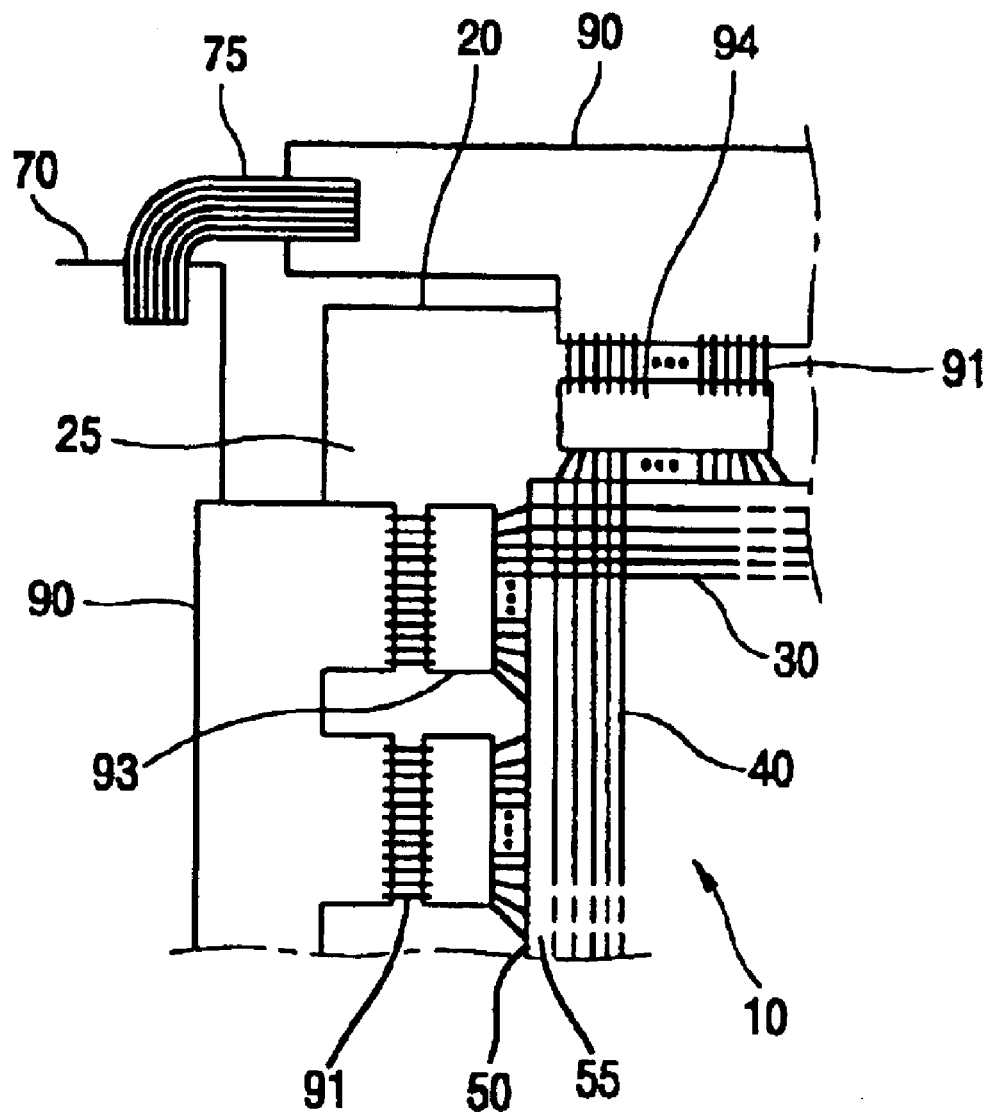
FIG. 2 is a partial plan view of a liquid crystal display panel of a COG method according to the related art.
Figure 3A:
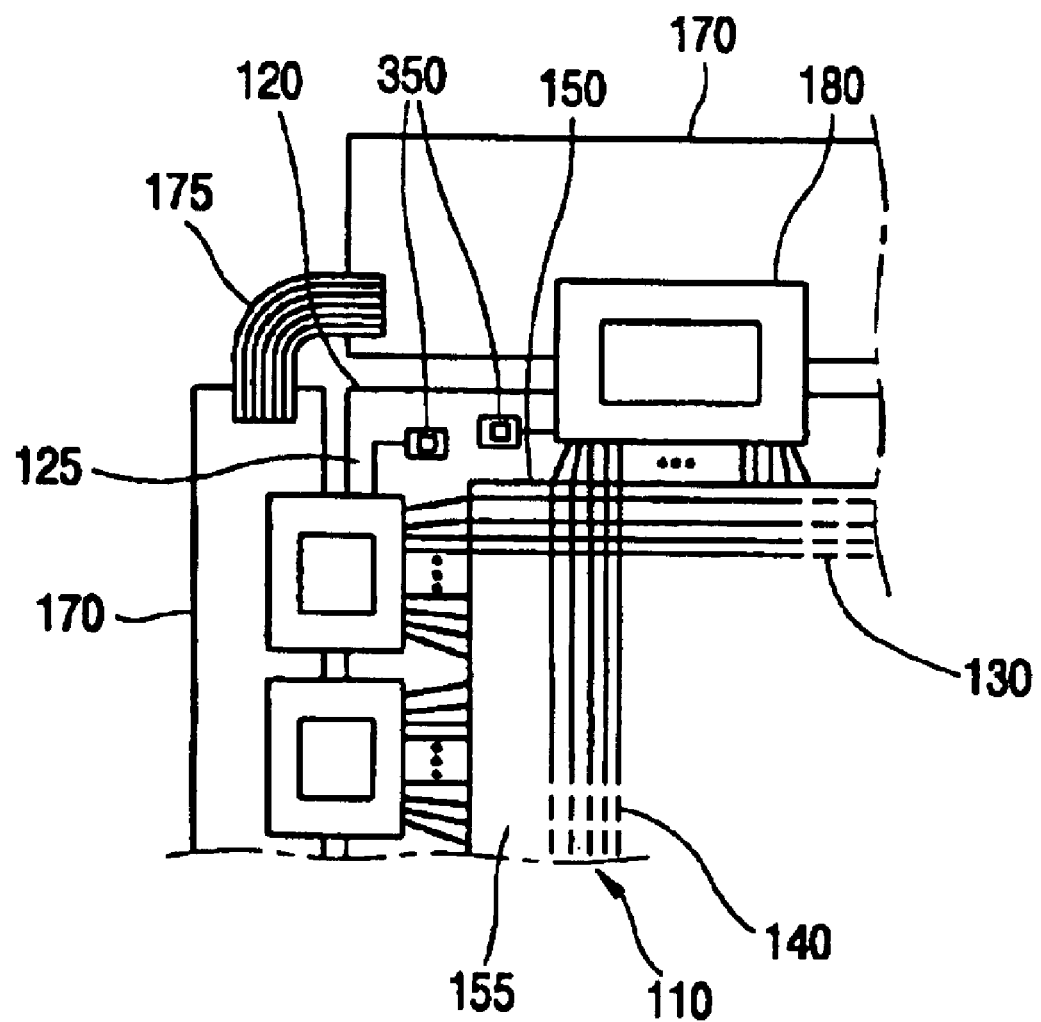
FIG. 3A is a partial plan view of an exemplary liquid crystal display panel according to the present invention.
Figure 3B:
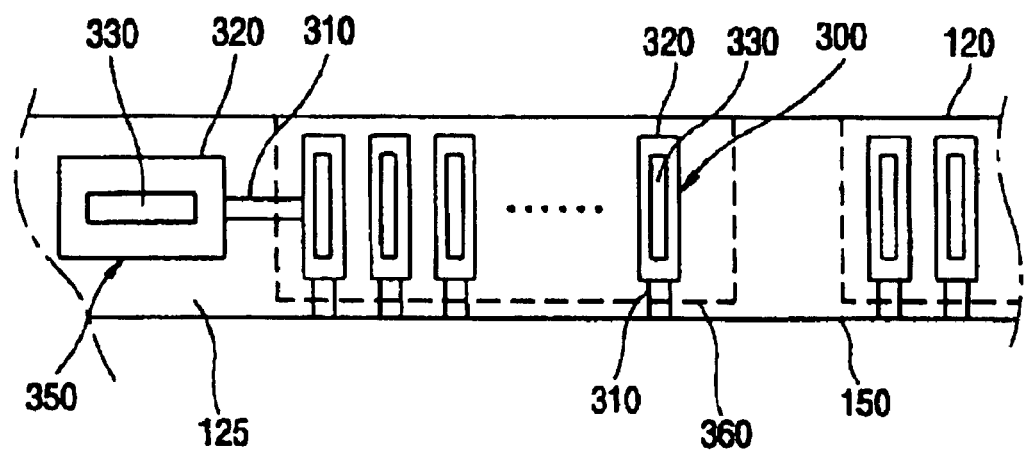
FIG. 3B is a partial enlarged plan view of an exemplary test bump and pad region of the liquid crystal display panel of FIG. 3A according to the present invention.

FIG. 3A is a partial plan view of an exemplary liquid crystal display panel according to the present invention, and FIG. 3B is a partial enlarged plan view of an exemplary test bump and pad region of the liquid crystal display panel of FIG. 3A according to the present invention. In FIG. 3B, a TCP (not shown) may be attached at a position 360 and may be electrically connected to a pad 300. The pad 300 may be formed along an edge portion of the liquid crystal display panel where an array substrate 120 does not correspond to a color filter substrate 150. Hereinafter, the edge portion of the liquid crystal display panel where the pad 300 is formed will be referred to as a pad region.

The pad 300 may include a conductive layer 310 that may constitute one of a gate line 130 or a data line 140, an insulating layer (not shown) formed on the conductive layer 310; and a transparent electrode layer 320 formed on the insulating layer (not shown). In addition, a contact hole 330 may be formed in the insulating layer (not shown) to electrically interconnect the conductive layer 310 and the transparent electrode layer 320.

A test bump 350 may be formed to protrude from the pad 300, and may be formed outside a region 360 where the TCP may be attached. The test bump 350 may include the conductive layer 310, the insulating layer (not shown), and the transparent electrode layer 320. The test bump 350 may be formed at the pad region of the array substrate 120 without an additional processing of the array substrate 120. Accordingly, the test bump 350 may be formed along the edge portion of the liquid crystal display panel 110 to provide for testing region.

Figure 4A:
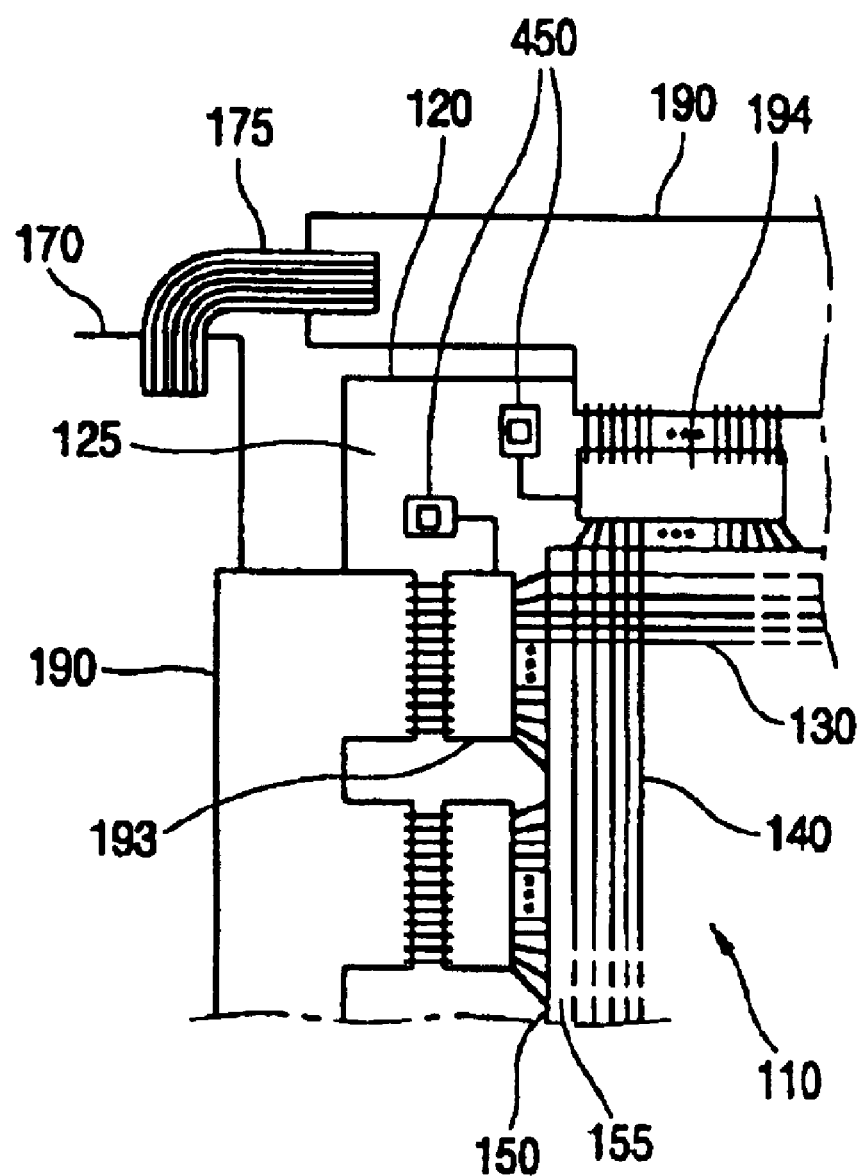
FIG. 4A is a partial plan view of another exemplary liquid crystal display panel according to the present invention.
Figure 4B:
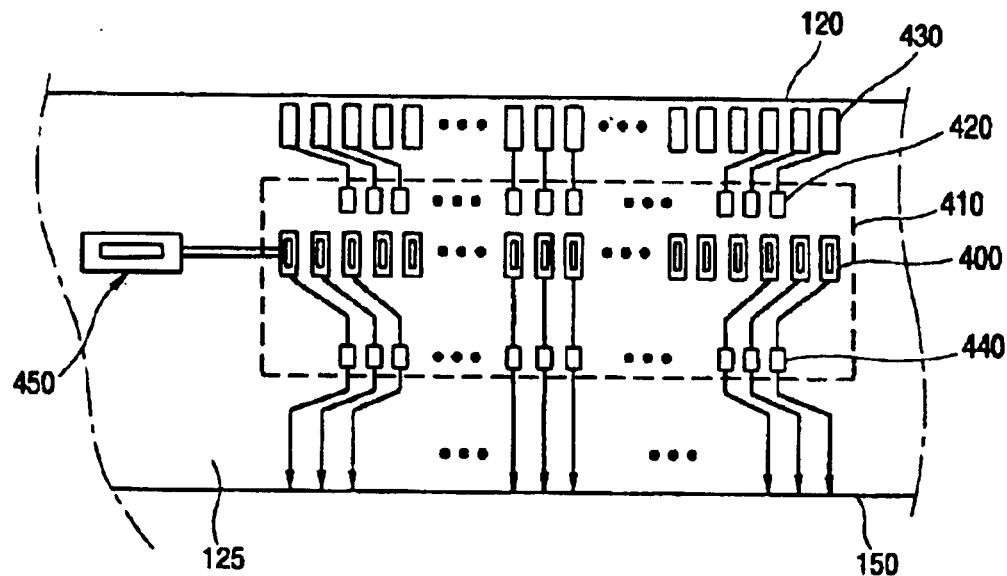
FIG. 4B is a partial enlarged plan view of another exemplary test bump and pad region of the liquid crystal display panel of FIG. 4A according to the present invention.

FIG. 4A is a partial plan view of another exemplary liquid crystal display panel according to the present invention, and FIG. 4B is a partial enlarged plan view of another exemplary test bump and pad region of the liquid crystal display panel of FIG. 4A according to the present invention. For convenience, the same reference numerals will be used to denote the same components of FIG. 3.

In FIG. 4B, a driver IC chip (not shown) may be attached with a location 410. In addition, an input terminal 420 of the driver IC chip (not shown) may be connected to a FPC pad 430 that is connected to an FPC, and an output terminal 440 of the driver IC chip (not shown) may be connected to a testing pad 400 for testing. The testing pad 400 may be used to test quality of the liquid crystal display panel 110 by applying a panel driving signal thereto before the driver IC chip is attached to the liquid crystal display panel 110.

In the case of the TCP method, gate and data pads 300 may be used as testing pads for testing, but in the case of the COG method, the testing pad 400 additionally may be formed inside the driver IC chip mounting region 410 in order to provide easy testing. In addition, an additional test bump 450 may be connected to the test pad 400. Although not shown, the test bump 450 may include a conductive layer, and insulating layer, and an electrode layer similar to those used in the TCP method, and may be formed outside the region 410 to which the driver IC chip is attached. Moreover, the test bump 450 may be formed to extend from the output pad (not shown) to which the output terminal 440 of the driver IC chip is connected, may be formed to extend from the pad for testing 400.

The test bumps 350 (in FIGS. 3A and 3B) and 450 (in FIGS. 4A and 4B) may be formed at a pad region of one of a first or last gate line 130 and a pad region of one of a first or last data line 140. Accordingly, as resolution of the liquid crystal display panel 110 increases, an interval between adjacent pads formed at the pad regions may decrease. Thus, the test bumps 350 and 450 may be formed along the edge portion of the lower substrate 120 to provide maximum space.

Figure 5:
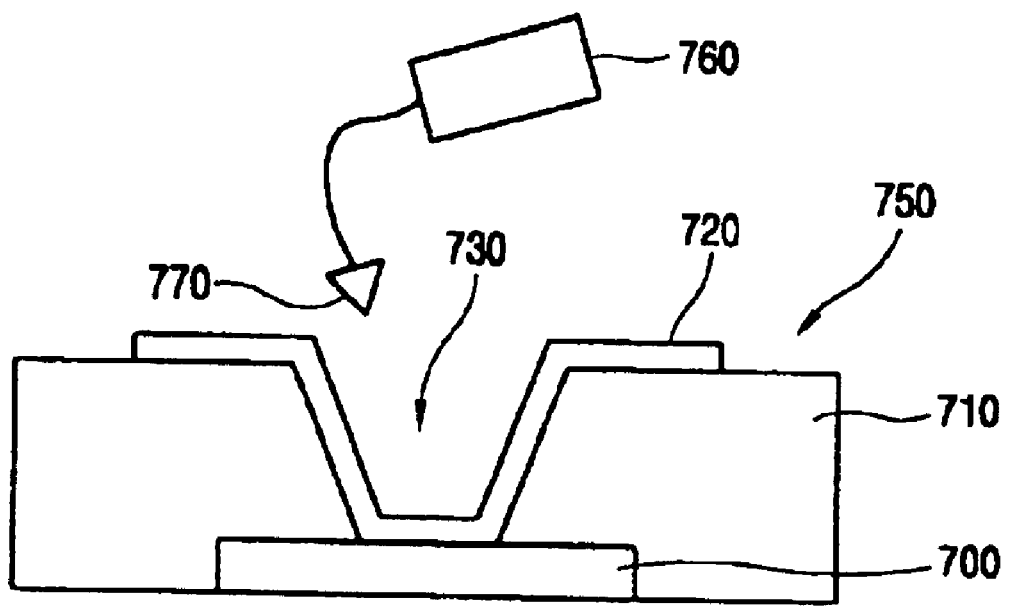
FIG. 5 is a cross sectional view of an exemplary test bump according to the present invention.

FIG. 5 is a cross sectional view of an exemplary test bump according to the present invention. In FIG. 5, a conductive layer 700, and insulating layer 710, and a transparent electrode layer 720 may be sequentially deposited onto a substrate (not shown) or another material layer (not shown). The transparent electrode layer 720 may be electrically connected to the conductive layer 700 through a contact hole 730 formed on th insulating layer 710. The liquid crystal display panel tests whether the driver IC is normally mounted by using the test bump 750 after the driver IC is mounted. A probe 770 of a test apparatus 760 may be contacted to the transparent electrode layer 720 of the test bump 750 to supply a signal to the test bump 750. The signal may be supplied to the test bump 750 through one of a gate or data line to drive a thin film transistor of a thin film transistor array.

When the signal is not supplied due to an open circuit condition of the data or gate lines of the thin film transistor array, a point defect or a line defect may be detected at a testing display screen. Similarly, when the signal is supplied to drive the thin film transistor array, the defects may not be generated. Accordingly, each data and gate line of the liquid crystal display panel may be examined.

Figure 6:
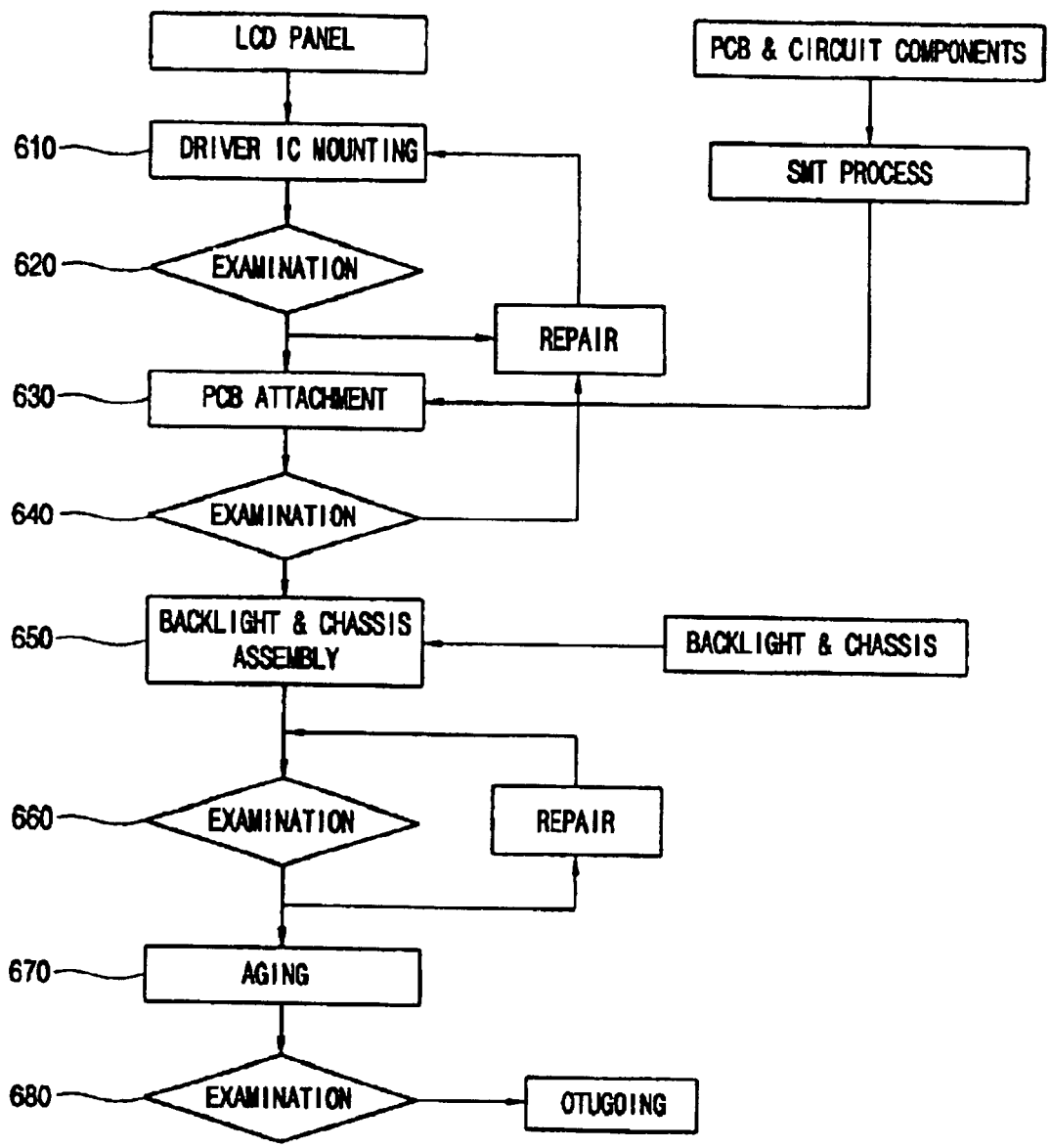
FIG. 6 is a flow chart of an exemplary fabrication process of a liquid crystal display device according to the present invention.

FIG. 6 is a flow chart of an exemplary fabrication processes of a liquid crystal display device according to the present invention. In FIG. 6, after a driver IC is mounted onto an LCD panel (step 610), a print circuit substrate upon which circuit components are mounted may be attached to the LCD panel (step 630). Then, a back light and a chassis are assembled (step 650) and aging is performed (step 680), thereby completing the liquid crystal display device. Whenever the respective processes are performed, the liquid crystal display panel may be examined using a test bump in accordance with the present invention (steps 620, 640, 660, and 680). Accordingly, defective parts, or part may be repaired during any one of the individual fabrication processes.

The test bump may be formed at any location as long as a space is formed at the pad region of the liquid crystal display panel. In addition, the test bump may be formed to extend from a pad to be tested except at both ends of the gate or data lines. Moreover, the test bump additionally may be formed outside the region where the driver IC is mounted, so that the liquid crystal display panel can be tested after the driver IC is mounted. Accordingly, even when the driver IC is incorrectly mounted, consecutive processes may be stopped and repair may be performed.

It will be apparent to those skilled in the art that various modifications and variations can be made in the bump structure for testing liquid crystal display panel and method of fabricating the same of the present invention without departing from the spirit or scope of the invention. Thus it is intended that the present invention cover the modifications and variations of this invention provided they come within the scope of the appended claims and their equivalents.

What is claimed is:

1. A bump structure for testing a liquid crystal display panel, comprising:

a plurality of pads arranged at a pad region along an edge portion of a liquid crystal display panel and connected to one of gate lines and data lines;

a plurality of driver ICs arranged to be electrically connected to the plurality of pads; and a test bump for testing a liquid crystal display panel under a state that driver ICs are mounted electrically connected to at least one of the plurality of pads and arranged at the pad region except within a region where driver ICs are mounted.

2. The bump structure according to claim 1, wherein ICs are mounted by a tape automated bonding method.

3. The bump structure according to claim 1, wherein driver ICs are mounted by a chip-on-glass method.

4. The bump structure according to claim 1, wherein the test bump is connected to one of the plurality of pads at one of a first and last gate lines.

5. The bump structure according to claim 1, wherein the test bump is connected to one of the plurality of pads at one of a first and last data lines.

6. The bump structure according to claim 1, wherein the test bump includes a conductive layer, an insulating layer formed on the conductive layer and having a contact hole, and a transparent electrode layer formed on the insulating layer and electrically connected to the conductive layer through the contact hole.

7. A method of fabricating a bump structure for testing a liquid crystal display panel, comprising:

forming a plurality of pads arranged at a pad region along an edge portion of a liquid crystal display panel and connected to one of gate line lines and data line lines;

mounting a plurality of driver ICs to be electrically connected to the plurality of pads; and connecting a test bump to at least one of the plurality of pads and arranged at the pad region except within a region where driver ICs are mounted.

8. The method according to claim 7, wherein the step of mounting driver ICs includes tape automated bonding.

9. The method according to claim 7, wherein the step of mounting driver ICs includes a chip-on-glass method.

10. The method according to claim 7, wherein the step of connecting a test bump includes connection to one of the plurality of pads at one of a first and last gate lines.

11. The method according to claim 7, wherein the step of connecting a test bump includes connection to one of the plurality of pads at one of a first and last data lines.

12. The method according to claim 7, wherein the test bump includes a conductive layer, an insulating layer formed on the conductive layer and having a contact hole, and a transparent electrode layer formed on the insulating layer and electrically connected to the conductive layer through the contact bole.

\* \* \* \* \*